(12) United States Patent
Cattaneo

(10) Patent No.: US 11,644,055 B2
(45) Date of Patent: May 9, 2023

(54) COMPACT JOINT FOR CONNECTING A FIRST PANEL AND A SECOND PANEL OF FURNITURE AND OTHER FURNISHING ITEMS

(71) Applicant: Leonardo S.r.l., Figino (IT)

(72) Inventor: Carlo Cattaneo, Figino (IT)

(*) Notice: Subject to any disclaimer, the term of this patent is extended or adjusted under 35 U.S.C. 154(b) by 0 days.

(21) Appl. No.: 17/555,891

(22) Filed: Dec. 20, 2021

(65) Prior Publication Data

US 2022/0397143 A1    Dec. 15, 2022

Related U.S. Application Data

(63) Continuation of application No. 16/309,247, filed as application No. PCT/EP2017/066496 on Jul. 3, 2017, now Pat. No. 11,346,383.

(30) Foreign Application Priority Data

Jul. 7, 2016 (IT) .......................... 102016000070928

(51) Int. Cl.
*F16B 12/20* (2006.01)

(52) U.S. Cl.
CPC ................................ *F16B 12/2063* (2013.01)

(58) Field of Classification Search
CPC .. F16B 12/20; F16B 12/2054; F16B 12/2063; F16B 2012/2045; Y10S 403/12; Y10S 403/13
See application file for complete search history.

(56) References Cited

U.S. PATENT DOCUMENTS

| 4,116,573 A * | 9/1978 | Fuchs | F16B 12/2063 |
| | | | 403/DIG. 12 |
| 4,300,850 A * | 11/1981 | de la Haye | F16B 12/2063 |
| | | | 403/381 |
| 5,292,095 A * | 3/1994 | Cattaneo | A47B 91/028 |
| | | | 248/188.4 |
| 5,667,327 A * | 9/1997 | Salice | F16B 12/2063 |
| | | | 403/DIG. 12 |
| 6,890,121 B2 * | 5/2005 | Mauri | F16B 12/2063 |
| | | | 403/231 |

(Continued)

FOREIGN PATENT DOCUMENTS

| EP | 1793129 A1 * | 6/2007 | ........... F16B 12/2063 |
| FR | 1311150 A * | 12/1962 | ........... A47B 91/028 |

(Continued)

*Primary Examiner* — Josh Skroupa
(74) *Attorney, Agent, or Firm* — Themis Law

(57) ABSTRACT

A compact joint for connecting a first panel to a second panel of furniture and other furnishing items, positioned perpendicular to each other, includes a plurality of interconnection and blocking components for joining and firmly blocking the two panels together. The plurality of components of interconnection and blocking components lies on the same plane, which is perpendicular to the first and second panels and which contains a coupling axis between the first and second panels that travels inside the first panel. The joint also defines an actuation axis that is perpendicular to the coupling axis and lies on a plane parallel and interspaced with respect to the first panel and perpendicular with respect to the second panel.

6 Claims, 8 Drawing Sheets

(56) References Cited

U.S. PATENT DOCUMENTS

| | | | | |
|---|---|---|---|---|
| 7,824,125 | B2* | 11/2010 | Dorney | F16B 5/0291 |
| | | | | 403/DIG. 12 |
| 8,992,114 | B2* | 3/2015 | Ajanovic | F16B 12/2063 |
| | | | | 403/DIG. 12 |
| 10,729,243 | B2* | 8/2020 | Carnelos | F16B 12/2063 |
| 10,827,838 | B2* | 11/2020 | Carnelos | F16B 12/2063 |
| 10,865,821 | B2* | 12/2020 | Cattaneo | F16B 12/2063 |
| 11,346,383 | B2* | 5/2022 | Cattaneo | F16B 12/2063 |
| 2020/0331106 | A1* | 10/2020 | Caputo | F16B 12/2063 |
| 2021/0270303 | A1* | 9/2021 | Cattaneo | F16B 12/2063 |

FOREIGN PATENT DOCUMENTS

| | | | | |
|---|---|---|---|---|
| WO | WO-2008129381 A2 * | 10/2008 | | A47B 95/008 |
| WO | WO-2009056935 A1 * | 5/2009 | | A47B 91/028 |
| WO | WO-2009077828 A1 * | 6/2009 | | A47B 95/008 |

* cited by examiner

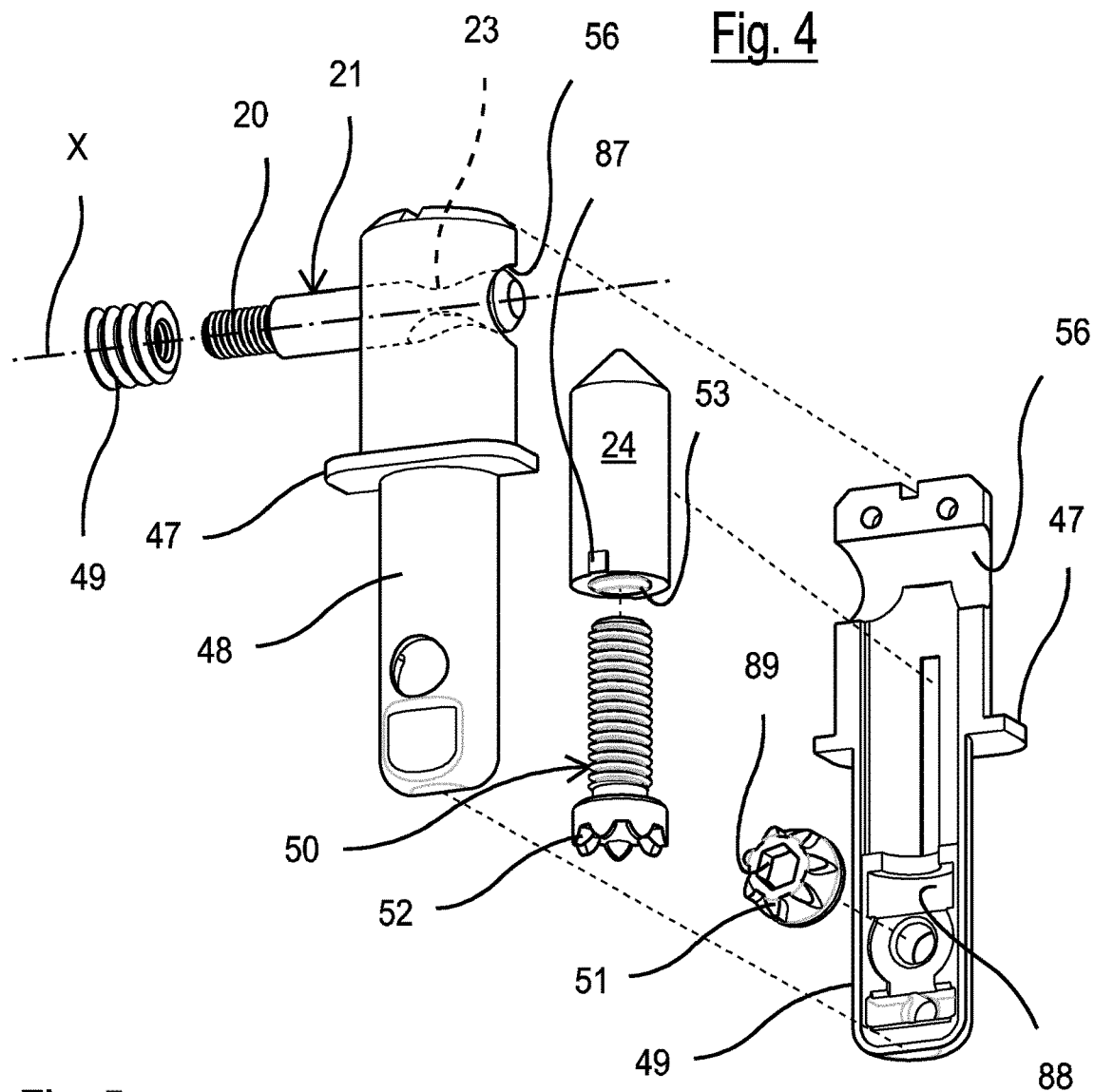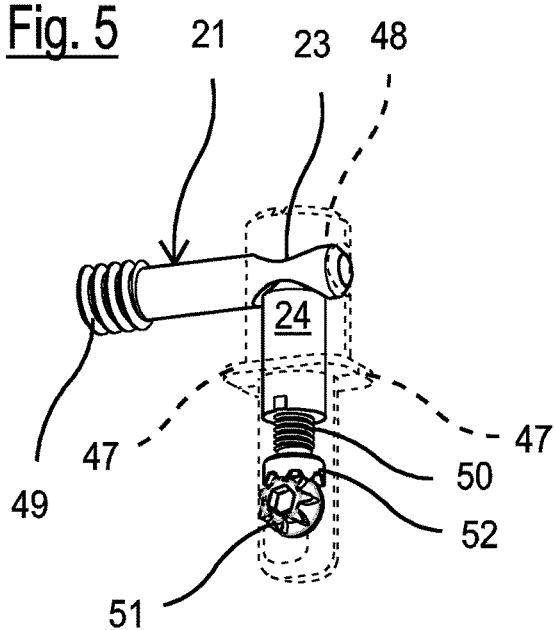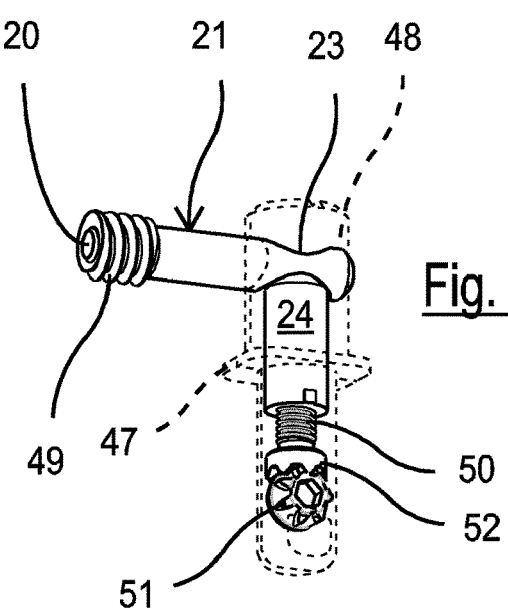

COMPACT JOINT FOR CONNECTING A FIRST PANEL AND A SECOND PANEL OF FURNITURE AND OTHER FURNISHING ITEMS

FIELD OF THE INVENTION

The present invention relates to a compact joint for connecting a first panel and a second panel of furniture and other furnishing items.

BACKGROUND OF THE INVENTION

Various types of joints are known, such as that object of European patent application EP 930436 A1 which provides a cam element for actuating expandable gripping means or in any case, a mechanism for actuating the joint, which require holings in the panels, having a certain complexity.

Other systems are also known for joining a panel or shelf or base or bottom of a piece of furniture and a shoulder or other panel of a piece of furniture in the furnishing industry in general. In these further examples, the joining is effected by positioning a plug screwed into a hole of the shoulder and, for example, a butt or similar constraining element inserted in a hole formed in the shelf or bottom or base of the furniture.

In order to produce this type of joint, a hole must be made in the shelf, bottom or base of the furniture, which receives the butt or similar constraining element which, in turn, houses a grub screw in a threaded portion of the same. This hole is not very pleasing to the user, even if covered by a special cap in an attempt to restore the aesthetics of the parts involved in the junction.

Furthermore, the presence of caps causes hindrances and obstacles for the positioning of objects on the bottom or base of the furniture, in any case being a source of disturbance for the user.

It should also be taken into account that an actuation from above, in particular for lower joints, is not always easy, in the presence of limited spaces between shelves or minimum distances from the bottom of the furniture or rear wall of the furniture, and, as already indicated, visible holes are required which are greatly criticized by users.

SUMMARY OF THE INVENTION

The general objective of the present invention is therefore to provide a relatively hidden joint that provides front actuation between a panel or shelf or base or bottom of a piece of furniture and a shoulder or other panel of a piece of furniture capable of solving the drawbacks of the known art mentioned above, in a simple, economical and functional manner.

A further objective of the present invention is to provide a joint between two panels which, in addition to having a minimum visibility on the part of an observer, and therefore a high aesthetical value, can be easily accessible, even from a free area between the bottom and floor where the furniture is positioned.

Another objective of the present invention is to provide a joint between portions of vertical walls and the bottom and shelves of a piece of furniture or furnishing item, which does not create a significant encumbrance and is adjacent between a panel or shelf or base or bottom of a piece of furniture and a shoulder or other panel of a piece of furniture, even between the bottom or base and the floor.

The above objectives are achieved by a joint produced according to the independent claim 1 and following subclaims.

BRIEF DESCRIPTION OF THE DRAWINGS

The structural and functional characteristics of the present invention and its advantages with respect to the known art will appear even more evident from the following description, referring to the enclosed schematic drawings, which show embodiment examples of the invention itself, all having the same innovative concept. In the drawings:

FIGS. 4, 5 and 6 are perspective views in various dimensions, one exploded and the other two of parts of what is shown in FIG. 4, of the mechanism of the joint of FIGS. 1 to 3;

DETAILED DESCRIPTION OF EMBODIMENTS OF THE INVENTION

With reference in general to the figures, these show embodiments of a compact joint for connecting a first panel and a second panel of furniture and furnishing items according to the present invention.

In the various figures, in fact, a first panel 12 is provided, which must be firmly interconnected to a second panel 11. The first panel 12, for example, can be a shelf or a base or a bottom or other panel of a piece of furniture and the second panel 11, a shoulder of a piece of furniture. In this way, the first panel 12 and the second panel 11 are positioned perpendicular to each other.

The joint also provides, either at least partially contained in the two panels 12, 11, or at least partially associated with the two panels 12, 11, a plurality of interconnection and blocking components for joining and firmly blocking the two panels 12 and 11 together.

The examples proposed also show how, according to the present invention, this plurality of components lie on the same plane B which is perpendicular to the first panel 12 and the second panel 11.

Figure 3:
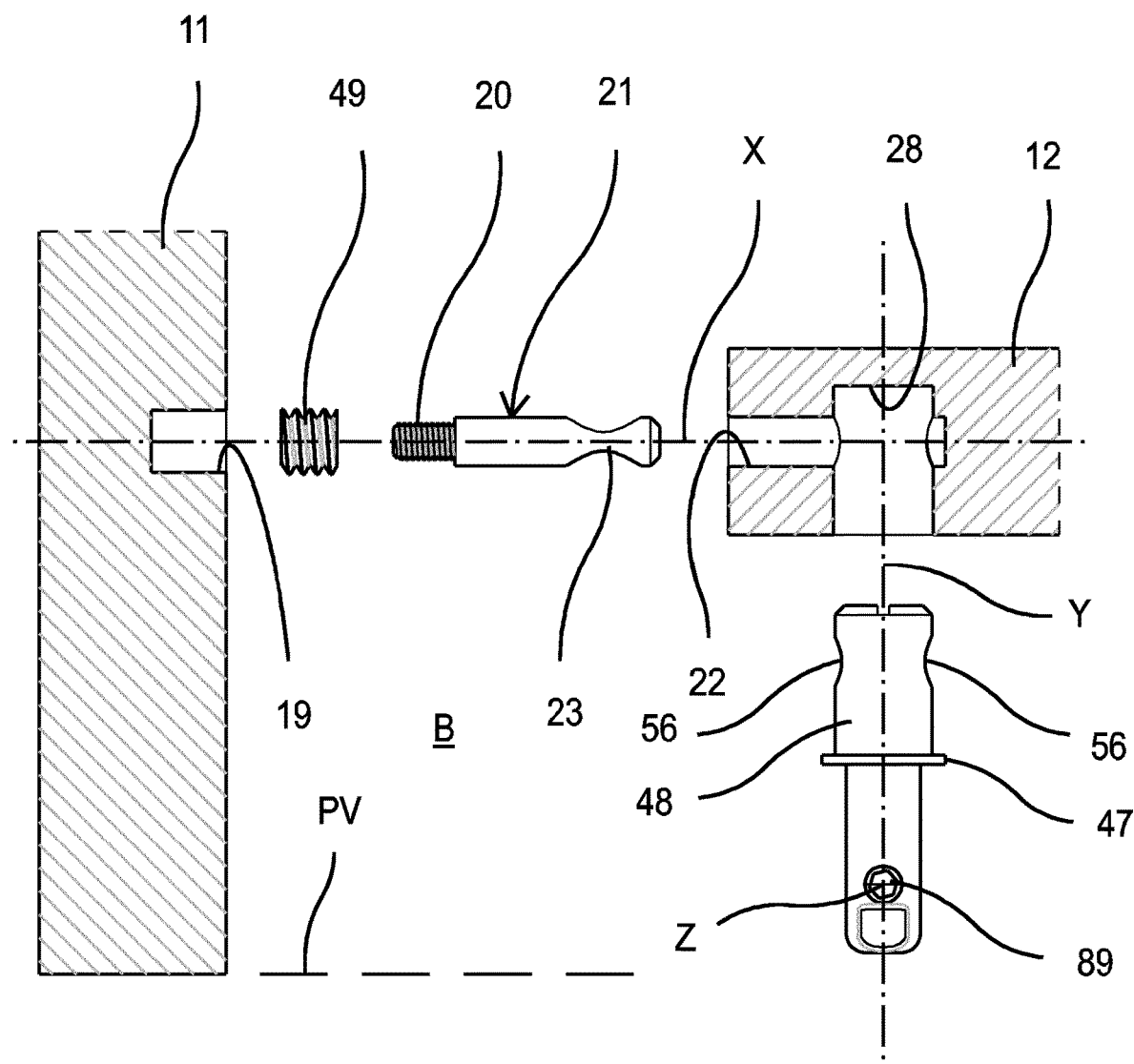
FIG. 3 is a raised exploded section of the joint shown in FIGS. 1 and 2.

The plane B also contains a coupling axis X between the two panels 12 and 11, wherein said coupling axis X is inside the first panel 12 on a plane A also inside the first panel 12. In FIG. 3, for example, the plane B is the plane of the sheet containing the same figure, whereas the plane A is the plane perpendicular to the sheet containing the coupling axis X between the panels 12, 11 which must be joined with the joint of the present invention.

More specifically, with respect to FIGS. 1 to 6, these show a first embodiment of a joint for connecting a first panel and a second panel of furniture and other furnishing items produced according to the present invention.

Figure 1:
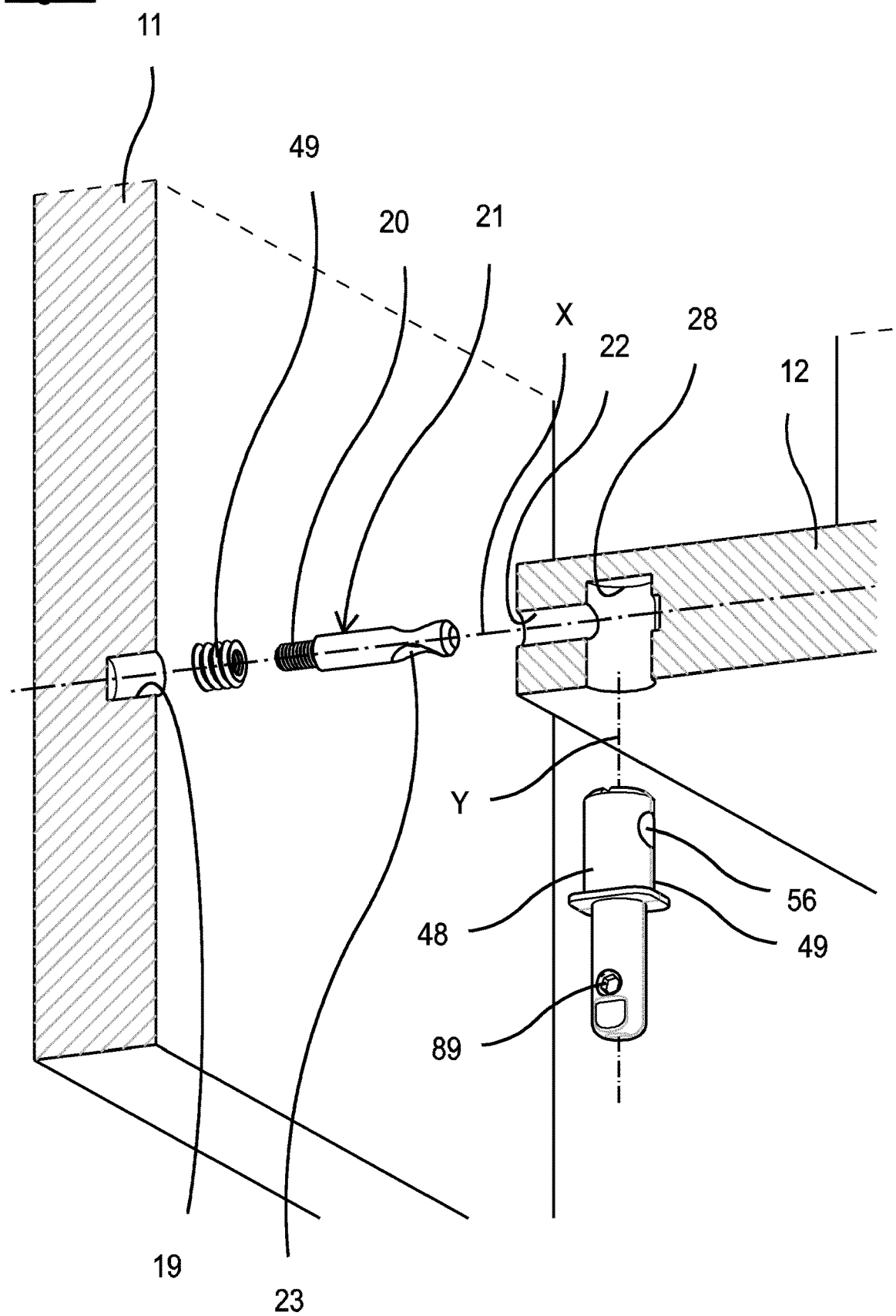
FIGS. 1 and 2 are perspective views, exploded and assembled, respectively, of a first embodiment of a compact joint for connecting a first panel and a second panel of furniture and furnishing items according to the present invention.

FIG. 1 shows an exploded perspective view of a joint according to the invention wherein a blind hole 22 is formed in the first panel 12, according to the axis X and suitable for receiving a pin 21. The pin 21, at one of its ends, has a threaded end 20 which is screwed into an internally threaded bushing 49 positioned in a blind hole 19, horizontal in the example, of the second panel 11, for example a shoulder of a piece of furniture.

The blind hole 19 of the second panel 11 is aligned with the hole 22 of the first panel 12 and both are arranged according to the axis X indicated above. The pin 21, when positioned with respect to the second panel 11, provides a housing 23 in its protruding part.

A second hole 28 is formed in the first panel 12 and intersects with the first hole 22. The hole 28 is directed according to an axis Y, vertical in the figures of this example, which is perpendicular to the axis X and which also lies on the plane B.

A pair of half-shells 48, 49 are housed in this blind hole 28, which form a cylindrical casing inside part of which a threaded drive screw 50 of a grub screw 24, is caused to rotate. The two half-shells 48 and 49 are only partially housed in this hole 28 as they each have half of a flange 47, in their intermediate portion.

When the two half-shells 48, 49 are joined, said flange 47 is arranged in abutment at the inlet of the hole 28 on the lower surface of the first panel 12.

The rotation of the threaded screw 50 is controlled by a pinion-toothed crown bevel. A pinion 51 is in fact rotatingly positioned inside a hole formed in one of the two half-shells 48, as shown in FIGS. 5 and 6.

The pinion 51 engages with a toothed crown 52, formed as the head of the above-mentioned threaded screw 50. The toothed crown 52 is rotatable inside a seat 88 formed in the two coupled half-shells 48 and 49. The threaded screw 50 is in turn positioned in an axial threaded hole 53 inside the grub screw 24.

A shaped tool 26, for example provided with a hexagonal head 27, is suitable for being inserted inside a complementary seat 89 of the pinion 51 so as to be coupled with it for causing its rotation.

The rotation of the pinion 51 in turn causes the rotation of the toothed crown 52 of the head of the threaded screw 50. The rotation of the threaded screw 50 forces the upward movement of the grub screw 24, as teeth 87 are provided that prevent the rotation of the grub screw 24.

Figure 2:
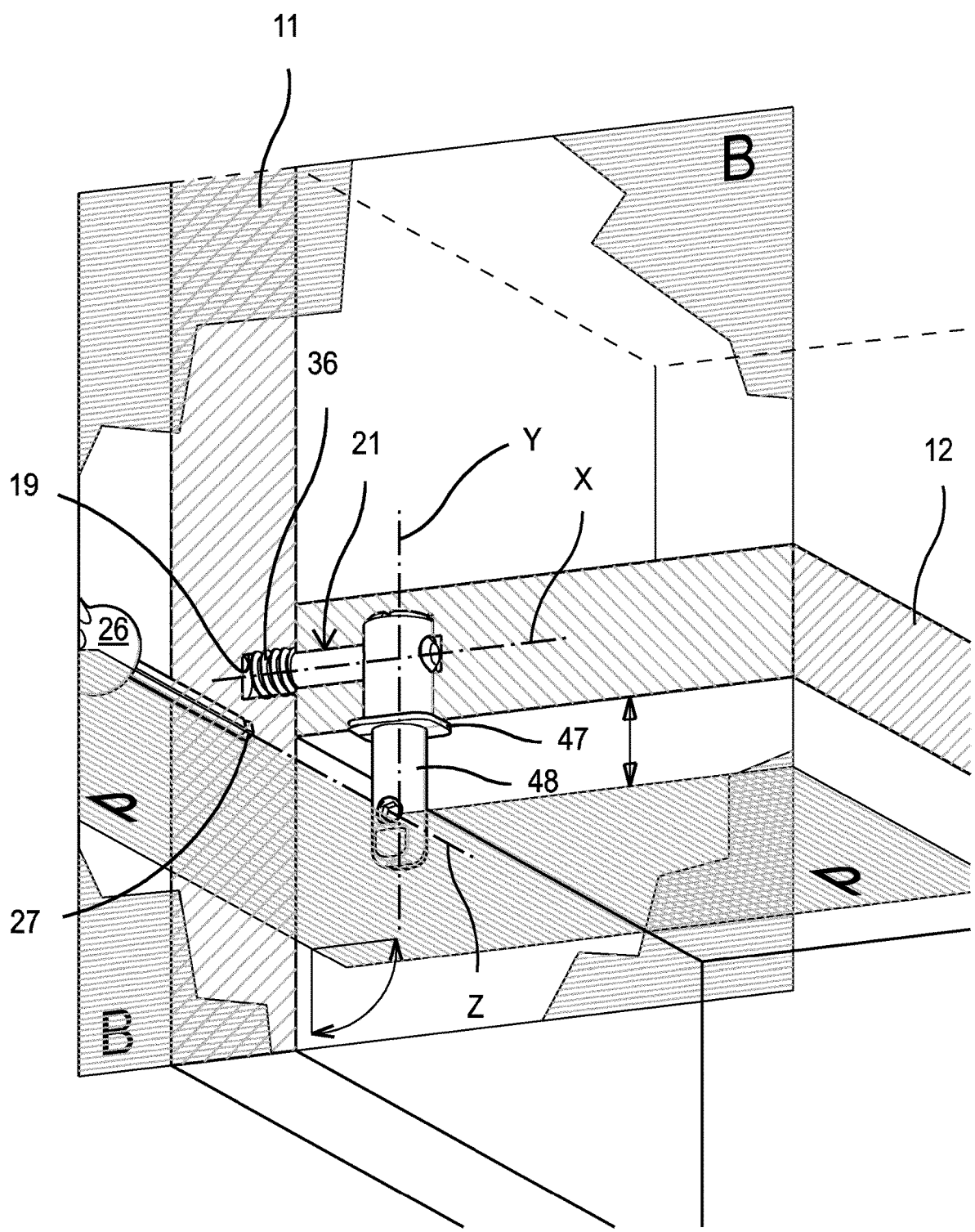

When the joint is assembled as shown in FIG. 2, the rotation and actuation described above cause the tip of the grub screw 24 to become engaged in the housing 23 of the pin 21, as shown in FIGS. 5 and 6, causing and stabilizing the blockage between the panels 12 and 11. The pin 21 passes through the shells 48, 49 thanks to the presence, in each of the same, of grooves 56 which, when coupled, define a passage hole of the pin 21.

An actuation axis Z of the threaded screw 50 is perpendicular to the plane B and the actuation is effected by inserting the hexagonal head 27 of the shaped tool 26 into the complementary seat of the pinion 51, as shown in FIG. 2.

In this way, a compact joint is produced according to the present invention.

FIGS. 7 to 12 show a second embodiment of a joint for connecting a first panel and a second panel of furniture and other furnishing items produced according to the present invention.

Figure 7:
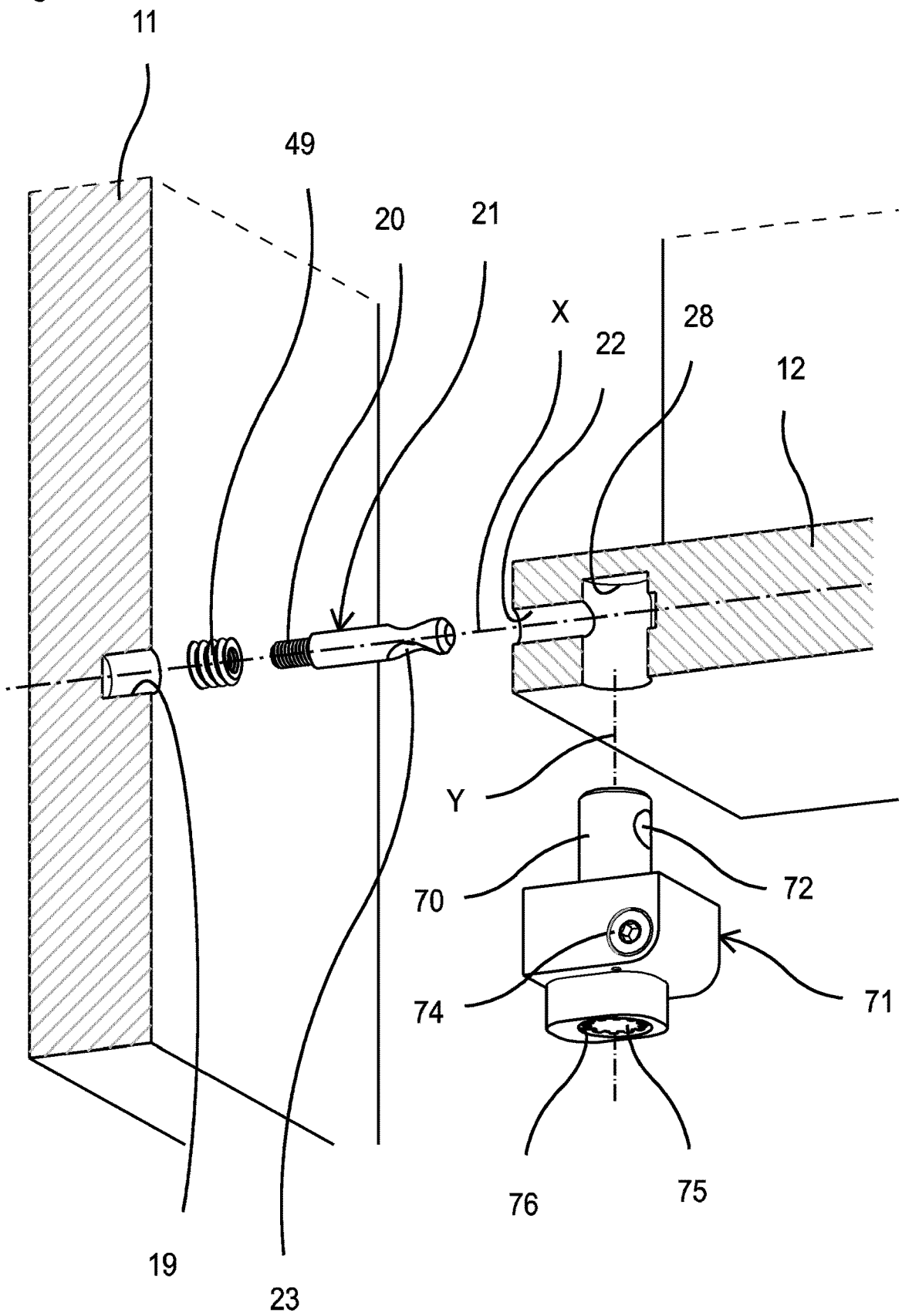
FIGS. 7 and 8 are perspective views, exploded and assembled, respectively, of a second embodiment of a compact joint for connecting a first panel and a second panel of furniture and furnishing items according to the present invention.

FIG. 7 shows an exploded perspective view of a joint according to the invention, wherein the same reference numbers are used for the same elements as those shown in FIGS. 1-6.

In this example, a different plurality of interconnection and blocking components are provided for joining and firmly blocking the two panels 12 and 11 together.

A cylindrical extension 70 of a casing or body 71 is in fact housed in the hole 28 of the first panel 12, in which a device with a worm screw and toothed drive wheel of a grub screw 24, is positioned. The cylindrical extension 70 is provided with pass-through holes 72 in which the pin 21 is inserted.

The body 71 has a seat 73 for a worm screw 74 arranged for collaborating with a toothed wheel 75, in turn housed in a seat 76. The worm screw 74 is kept rotating in the seat 73, thanks to a plug 77.

The toothed wheel 75 integrally carries a threaded portion 78 which is screwed into an internal threading (not shown) formed in the cylindrical extension 70 positioned above the body 71. The threaded portion 78 containing the grub screw 24 is therefore forced to move in the seat 76 when rotated, thus engaging the housing 23 of the pin 21, blocking it.

Figure 8:
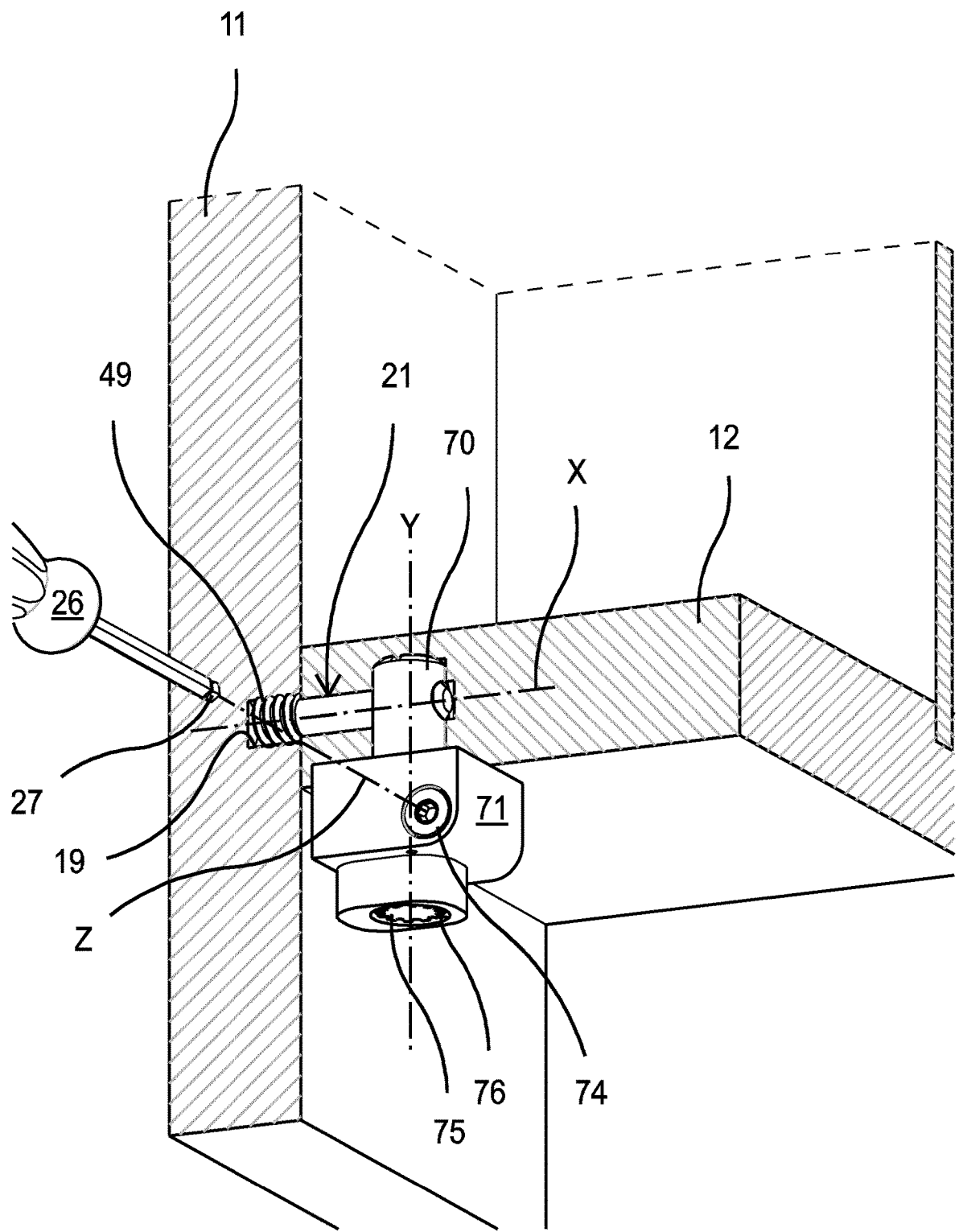
Figure 9:
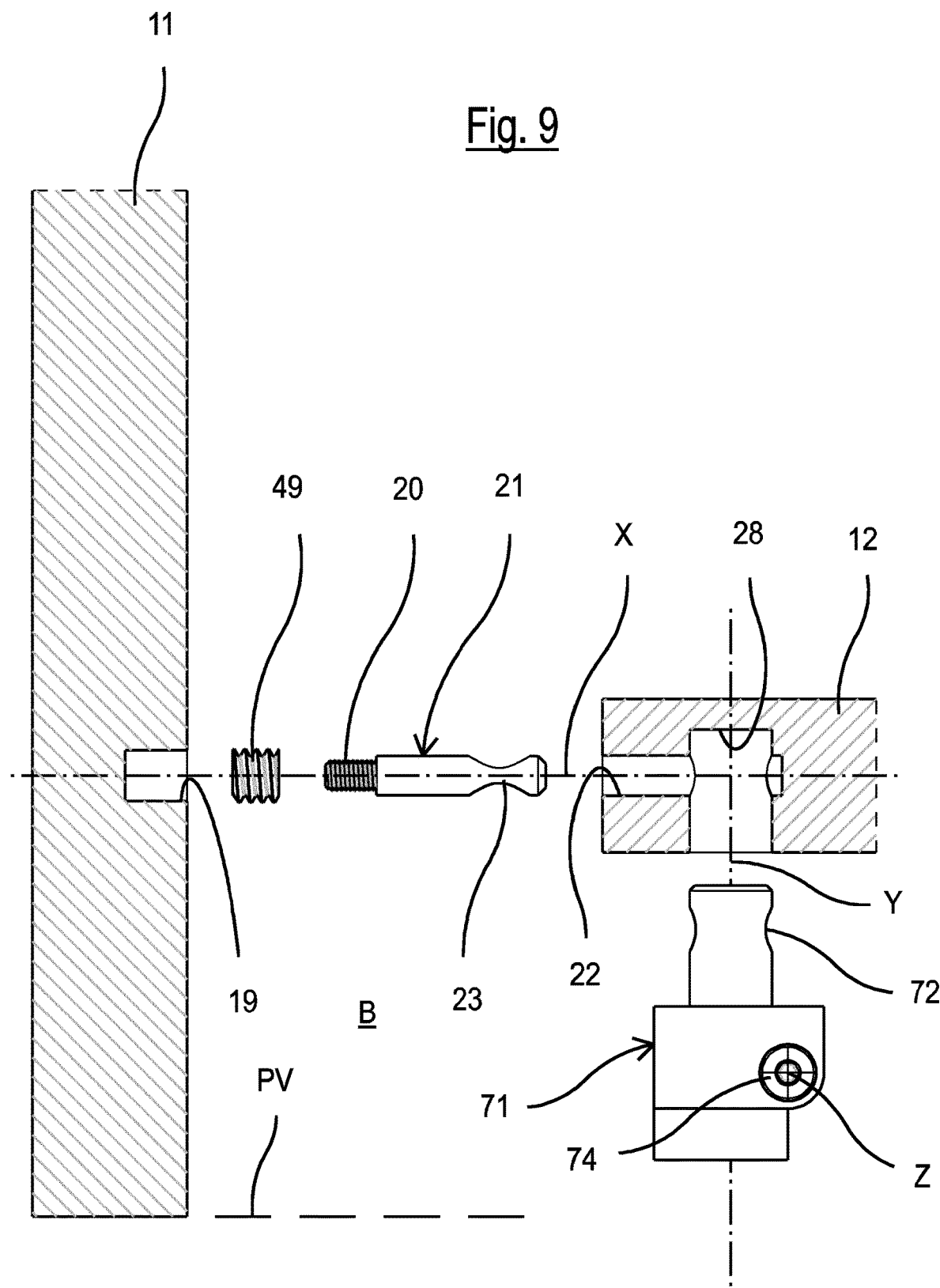
FIG. 9 is a raised exploded section of the joint shown in FIGS. 7 and 8.
Figure 10:
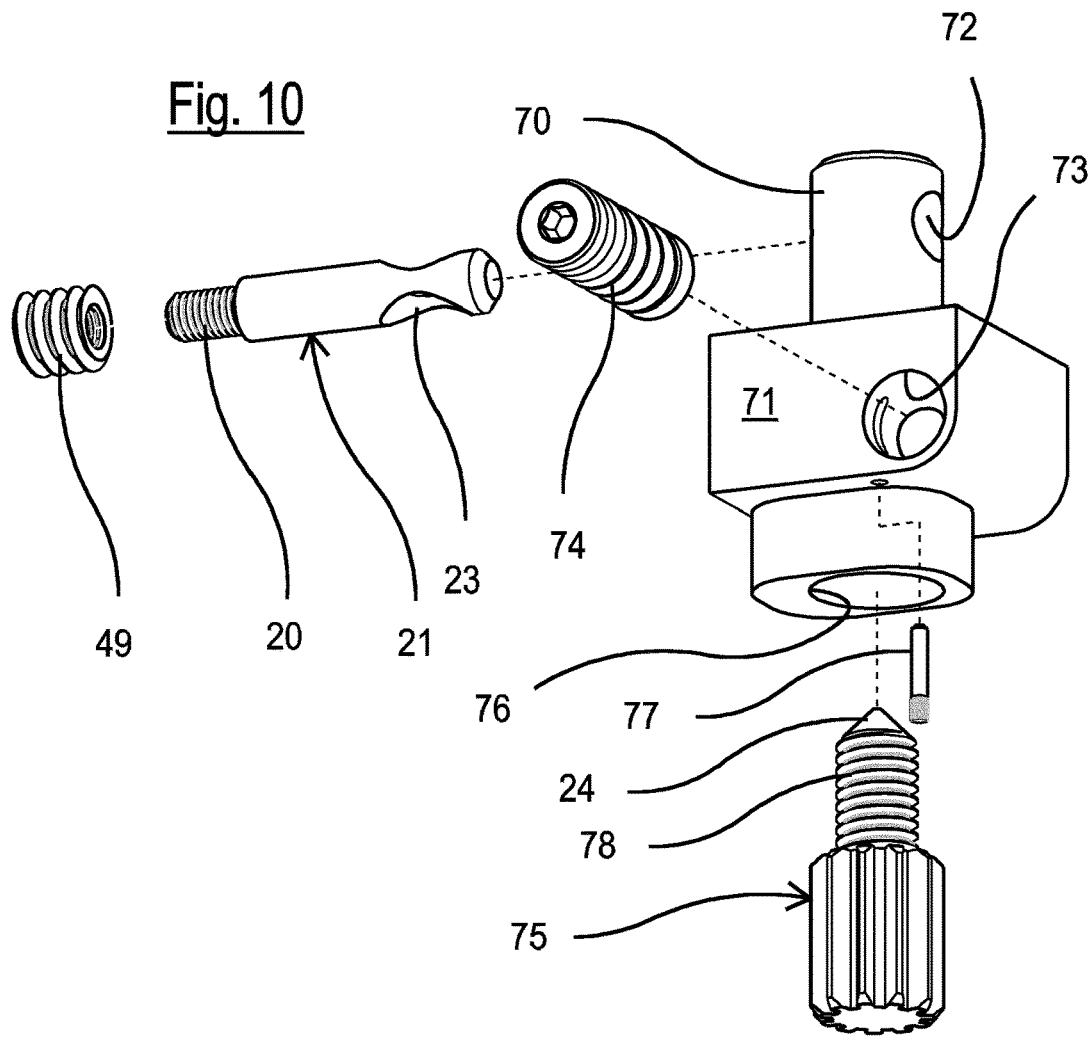
FIGS. 10, 11 and 12 are perspective views in various dimensions, one exploded and the other two assembled of parts of what is shown in FIG. 10, of the mechanism of the joint of FIGS. 7 to 9.
Figure 11:
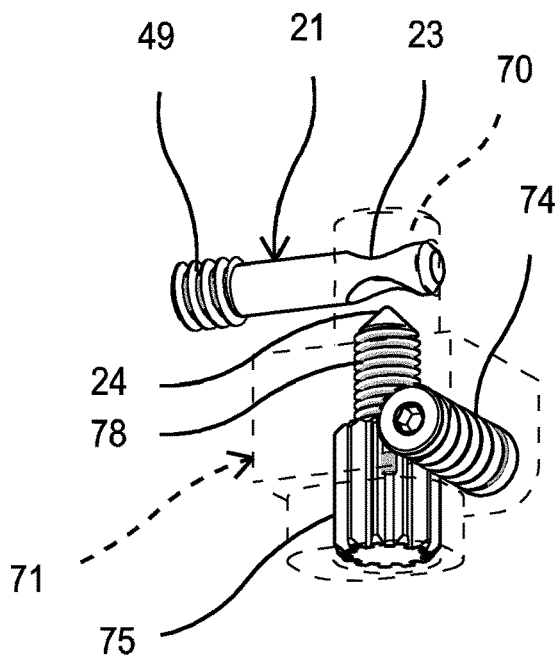
Figure 12:
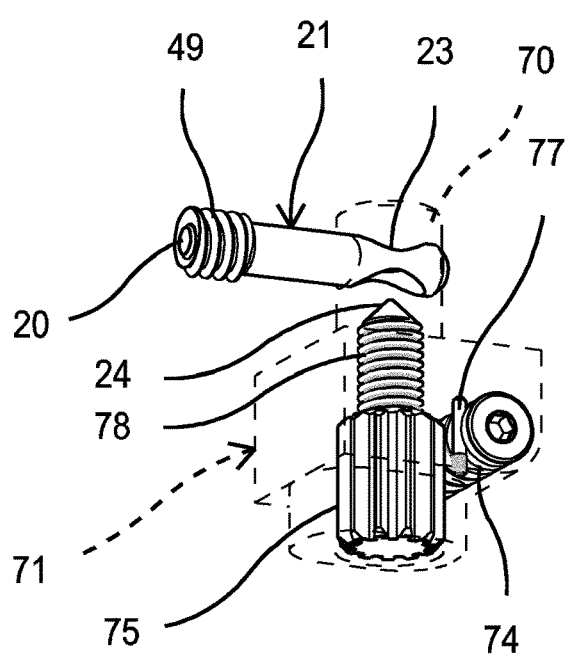

When this second embodiment of a joint is also assembled as shown in FIG. 8, the rotation and actuation described above cause the tip or grub screw 24 to become engaged in the housing 23 of the pin 21, causing and stabilizing the blockage between the panels and 11. The pin 21 passes through the cylindrical extension 70 passing through the pass-through holes 72.

An actuation axis Z of the worm screw 74 is perpendicular to the plane B and the actuation is effected by inserting the hexagonal head 27 of the shaped tool 26 into the complementary seat of the worm screw 74, as shown in FIG. 8.

In this way, a compact joint is produced according to the present invention.

The inventive idea at the basis of the present invention is consequently the provision of a compact joint for connecting a first panel 12 and a second panel 11 of furniture and other furnishing items, positioned perpendicular to each other, wherein said joint comprises a plurality of interconnection and blocking components for joining and firmly blocking said two panels 11, 12 together, and wherein said plurality of components lies on the same plane B which is perpendicular to said first panel 12 and said second panel 11 and which contains a coupling axis X between said panels 12, 11, said coupling axis X being inside said first panel 12. According to the invention, the actuation axis Z of the joint is perpendicular to the axis X and lies on a plane P which is parallel and interspaced with respect to the first panel 12 and perpendicular with respect to the second panel 11.

It can thus be seen how a front actuation is effected by means of a joint according to the invention, providing a solution to the problems encountered in the known art indicated above.

Primarily, all visible holes have been eliminated from the furniture and an adjustable joint has been provided that can be actuated in the minimum space existing beneath the first panel or bottom or base and the floor P from a front position.

The elements of the system have been minimized and are extremely simple to construct and use. The holings in the two panels 11 and 12, such as shoulders and bottom or base have also been minimized.

The advantages and innovative characteristics of a compact joint for connecting a first panel and a second panel of furniture and other furnishing items according to the present invention are therefore evident.

The forms and structure for producing a joining system with front actuation in axis with a bottom according to the present invention, as also the materials and assembly modes, can naturally differ from those shown for purely illustrative and non-limiting purposes in the drawings.

The objectives mentioned in the preamble of the description have therefore been achieved.

The protection scope of the present invention is defined by the enclosed claims.

The invention claimed is:

1. A joint adapted for use in furniture and other furnishing items having a shelf and a shoulder positioned perpendicular to each other, comprising:
   a plurality of interconnection and blocking components joining and blocking the shelf and shoulder together,
   wherein the plurality of interconnection and blocking components lies on a same first plane, which is perpendicular to the shelf and the shoulder and which contains a coupling axis along a coupling direction between the shelf and the shoulder, the coupling axis being defined inside the shelf, the joint further defining an actuation axis,
   wherein the actuation axis of the joint is perpendicular to the coupling axis and lies on a second plane, which is parallel and interspaced with respect to the shelf and perpendicular with respect to the shoulder, and
   wherein the plurality of interconnection and blocking components of the joint comprises a body disposed beneath the shelf and coupled thereto, the body containing a worm screw cooperating with a toothed wheel so as to cause a stem extending from the toothed wheel to slide and become engaged in a housing of a pin connected to the shoulder.

2. The joint according to claim 1, wherein the body includes a cylindrical extension extending from the body, and wherein the cylindrical extension is adapted to be received in an opening in the shelf and has an aperture configured to receive the pin.

3. The joint according to claim 2, wherein the body has a first seat configured to receive the worm screw, wherein body has a second seat housing the toothed wheel, wherein and the worm screw engages the toothed wheel, and wherein the stem is threaded and is received in an internal threading formed in the cylindrical extension.

4. The joint according to claim 3, wherein an end of the stem defines a grub screw, and wherein the grub screw engages the housing in the pin.

5. The joint according to claim 1, wherein the coupling axis between the shelf and the shoulder is further defined on a third plane perpendicular to the first plane.

6. The joint according to claim 1, wherein an end of the pin is adapted to be engaged in a hole formed in the shoulder.

* * * * *